Figure 1:
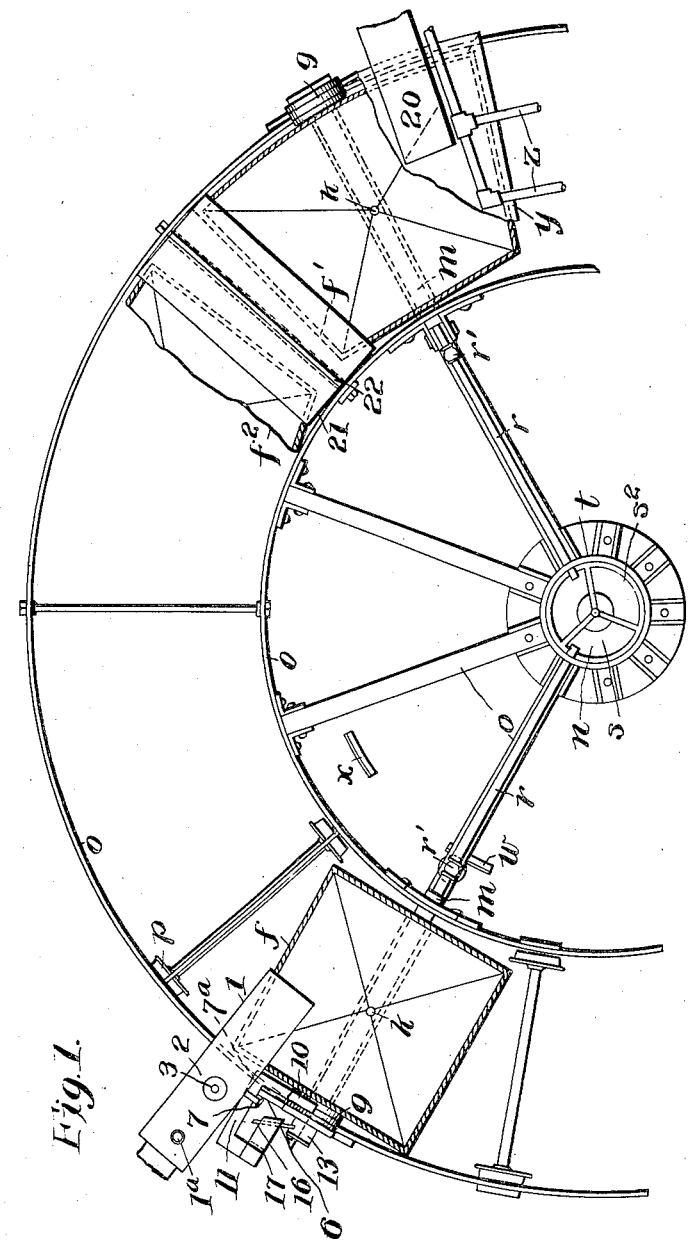

No. 830,388. PATENTED SEPT. 4, 1906.
W. T. WEEKLEY.
APPARATUS FOR TREATING SLIMES AND SIMILAR MATERIALS.
APPLICATION FILED MAR. 27, 1906.

3 SHEETS—SHEET 1.

Witnesses
Inventor
W. T. Weekley.
his Attorneys

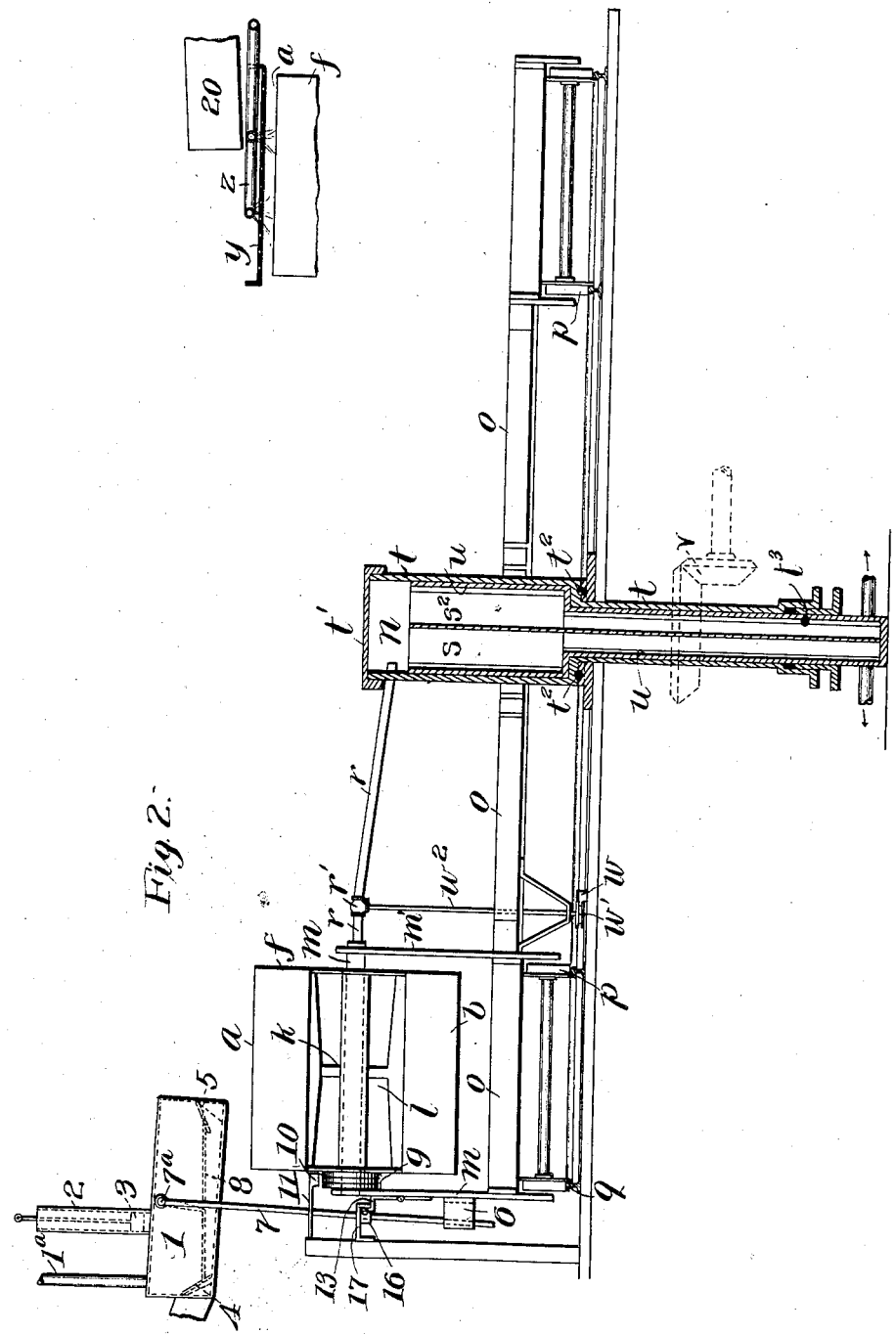

No. 830,388. PATENTED SEPT. 4, 1906.
W. T. WEEKLEY.
APPARATUS FOR TREATING SLIMES AND SIMILAR MATERIALS.
APPLICATION FILED MAR. 27, 1906.
3 SHEETS—SHEET 3.
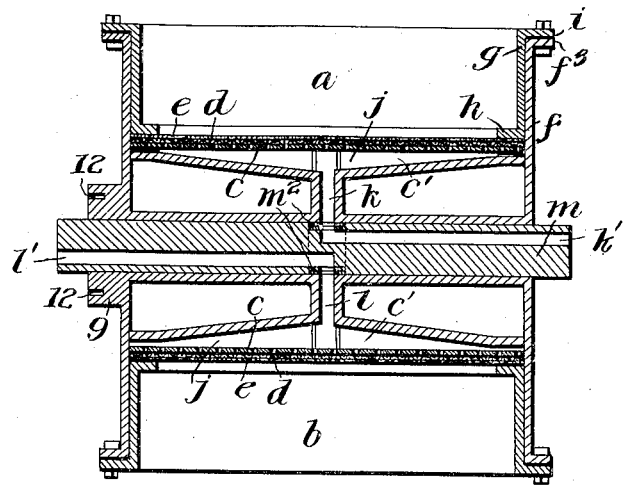
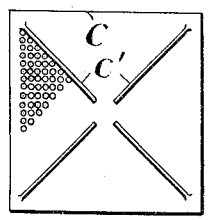
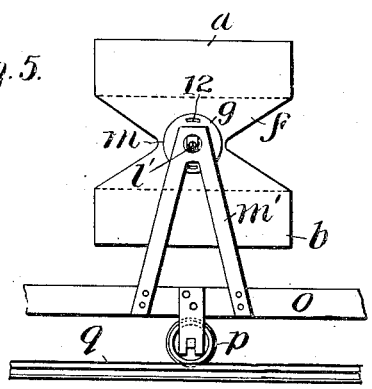
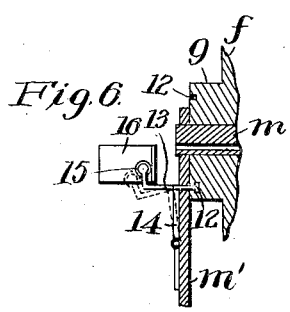
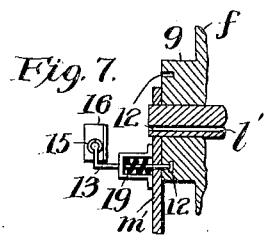
Witnesses
Inventor
W. T. Weekley.
his Attorneys.

UNITED STATES PATENT OFFICE.

WILLIAM THOMAS WEEKLEY, OF KALGOORLIE, WESTERN AUSTRALIA, AUSTRALIA.

APPARATUS FOR TREATING SLIMES AND SIMILAR MATERIALS.

No. 830,388.      Specification of Letters Patent.      Patented Sept. 4, 1906.

Application filed March 27, 1906. Serial No. 308,337.

*To all whom it may concern:*

Be it known that I, WILLIAM THOMAS WEEKLEY, a subject of the King of Great Britain and Ireland, residing at Kalgoorlie, in the State of Western Australia, Commonwealth of Australia, have invented certain new and useful Improvements in Means for Treating Slimes and Similar Materials; and I do hereby declare the following to be a full, clear, and exact description of the invention, such as will enable others skilled in the art to which it appertains to make and use the same.

The object of this invention is to provide improvements for and in the treatment of mineral slimes and cognate material. Its chief application is to separate from finely-divided material cyanid solution or liquid which contains gold.

The plant viewed as a whole may be classed as a self charging and discharging slime (or material) treating machine, which with little driving power and a minimum of supervision will handle a comparatively large quantity of material in a given time. It comprises a series of trays (or the like) to receive material to be filtered, these trays being suitably supported and forming pairs (or series) with lower trays. Each pair or series is reversible. When the lower trays become by transposition the upper ones, they are in turn charged with material. Piping is so attached that when the upper trays are charged with material (hereinafter called "slime") a series of vacua may be formed (or the air-pressure may be so reduced) in chambers under those trays that liquid or solution will be caused to filter through into the said chambers (hereinafter called "vacuum-chambers") and thence to a receiver or one or other of a series of receivers. The vacuum-chambers have apertured top plates, as of strong perforated metal, over which is spread filtering medium with suitable jointing or fastening. The trays or tray-supports are arranged on standards or carriers (hereinafter called "trucks") adapted to move in a circuit or along any suitable course, on rails ordinarily. Such vibration as the trays receive in their motion is beneficial. The trucks are connected by piping to a main or central chamber or chambers, any suitable vacuum pumping means or the like being used. By arranging the tray-trucks or vacuum-filters in and moving them repeatedly around a circuit or other continuous course my process may be carried on so as to filter from a number of trays at once, successive charges of slime being fed to each tray and the resultant cakes of mineral discharged. When it is found that by increasing the speed of rotation higher extraction results are secured, the speed is very easily raised, with the further advantage that a relatively greater weight of slime will then be treated in a given time. Any well-known or suitable cycle of treatment may be adopted. Thus I have extracted what is called the "strong" solution, then a "weak" solution, and then a "water wash," appropriate liquids or charges being supplied to each upper tray at any suitable intervals and as often as desired. Any useful variations in tray-supply may be made which use features of this invention. The trucks have perforated or drilled shafts or the like, through which passages connecting to the trays extend. One passage is a solution (conveying) passage and the other is an air (admission) passage. When a pair of filters are moved so that the upper one becomes the lower, its contents cease to be subjected to the vacuum or suction and become subjected to air-pressure. This allows or causes the cake to fall out from what has become the lower tray. The filter-cakes thus fall in a given place and may be readily removed thence by any practicable means. The cake-discharge occurs at any suitable interval, as once in each circuit, and it will be understood that no claim is made broadly to the formation of filter-cakes by vacuum action.

The above and other details are below referred to by reference to the accompanying drawings, in each figure of which some parts of my machine are illustrated, although any variations or additions may be used which still involve this invention, which as regards my broader claims evidently allows of considerable latitude in the details of construction and working.

Figure 1 is a plan, and Fig. 2 a sectional elevation, showing a revoluble platform with trucks and other parts. Fig. 3 shows in vertical section a truck having a pair of trays and vacuum-chambers. Fig. 4 shows the under side of a perforated plate of a tray, only some of the perforations being shown. Fig. 5 shows in side view a truck on its carriage. Fig. 6 shows in vertical section means to hold and to release the truck so as to allow inversion of the pair of trays at the right time, and Fig. 7 shows modified details.

$a$ and $b$ show, respectively, an upper and under tray, $e$ being a filter-cloth on a wire net or the like $d$ on a perforated plate $c$. The trays are in a tray-frame or filter-truck $f$. The filter-walls are part of a member $g$, having a lower edge all round, as $h$, shown flanged to make an air-tight filter-joint. Member $g$ is shown with a flange $i$, secured to a flange $f^3$ on frame $f$. Felt, blanketing, rubber, or other suitable material is used at will, (to make the filter-jointing air-tight,) as under the edges of grating $c$ and under flange $h$. A chamber $j$ is under or adjoins plate $c$, the under side of which has ribs $c'$ or means to rest on the chamber-bottom, which is shown so sloped that moisture therein drains into an aperture or tube marked $k$, as to the upper filter in Fig. 3 and as to the lower $l$.

Trucks $f f' f^2$ are in part seen in Fig. 1, parts, as $a$ to $e$ and $g$ to $i$, being omitted. In practice as many trucks fully equipped are (or may be) used as closely set as convenient, allowing for inversion. Truck $f'$ has a form suited for economical working of a circular series of trucks, as it avoids large vacant intermediate spaces. Shaft $m$ passes through an aperture or bearings in truck $f$ and has any suitable supports $m'$.

$k'$ is a shaft-passage (or vacuum or solution passage) for forming a vacuum (or low air-pressure) in upper chamber $j$ to cause solution to be filtered. Passage $l'$ (which I call the "air-passage") is open to the atmosphere and causes the vacuum (or the like) contiguous to the charged tray to be destroyed when it becomes the lower tray.

$m^2$ is a piston-ring or other means to make an air-tight shaft-joint. The trucks are turned over in any convenient way, and the connections $k$ and $l$ become transposed. Charging of each upper tray takes place in turn at convenient points in any convenient way. The truck-carriage $o$ has wheels $p$ and rails $q$.

$r$ represents rotating connecting-pipes (from shaft $m$) to overhang or feed into the non-rotating main vacuum-chambers $s s' s^2$, according to the positions of said pipes $r$.

If the plant be a small cheap one, manual labor may be substituted for automatic devices herewith shown and preferred. To fill the trucks automatically, devices are shown by which as each upper tray comes under the feed-receptacle next mentioned it is charged.

1 is a feed-receptacle for slime, filled from a vat or supply (not shown) and adapted to be regulated (without stopping the machine) to hold a desired charge, so that the thickness of slime on the filter shall be as required. Such regulation enables a cake to be made which will retain satisfactory evenness and facilitate the extraction of a satisfactorily high percentage of liquid or solution. A tube 2 or extension from vessel 1 is shown fitted with a piston 3, movable for regulation of charge, as aforesaid. Vessel 1 is shown inclined, having an inlet and a discharge-gate 4 and 5, respectively. When either is open, the other is closed. When gate 5 is open, it allows the charge to fall into any tray $a$ located below, and when gate 5 is closed gate 4 allows vessel 1 to refill. To move the gates, any suitable means are used. A deflector or inclined surface 6 is, in Figs. 1 and 2, shown fixed to a support, as $m'$. In its path is a lever 7, having arm $7^a$ so connected to a rod 8, (shown within vessel 1,) connecting the gates, (also shown within vessel 1,) that when the deflector moves the lever (as per arrow at its foot) the gates move also. Any suitable passages, valves, or apertures for air are provided on vessel 1, as pipe $1^a$, extending as high as appropriate. When deflector 6 passes lever 7, the weight of the slime outside vessel 1 opens gate 4 and closes 5, or any other device, as a spring or weight, effects this. The suction of the vacuum-pump or the like is stopped on that tray $a$ which is being charged by vessel 1 to allow the slime to settle evenly or sufficiently so on the filter. During this settlement the truck moves on, the suction being soon resumed. Any suitable means are used. Thus carriage $o$ supports spindle $w^2$ of a friction-wheel or the like $w'$, adapted to be turned by a friction-block $w$, set in the wheel-path. This turning movement closes valve $r'$ on tubing $r$ at the head of spindle $w^2$. This cuts off the suction. When wheel $w'$ reaches a friction-block or the like $x$, the latter further turns the wheel, its spindle, and valve $r'$, so that tube $r$ is opened and the vacuum begins to be made in chamber $j$. It will now be seen that shortly after any tray is charged solution flows from it into chamber $j$, passages $k k'$, tube $r$, and then into one or other of divisions $s s' s^2$ of pipe $u$, within and through the top $n$ of an air-tight chamber $t$, fixed to or rotating with frame $o$.

$v$ indicates any means of rotation. Speed is adjusted to suit the extraction. Chambers $s s' s^2$ communicate (as by the pipes shown under the stuffing-box $t^3$) with suitable receivers or sumps, (not shown,) the liquid thus extracted being thereon available to be treated in any desired way. Chamber $t$ has a cap $t'$ (omitted in Fig. 1) and any desired friction-reducing supports, as ball-bearings, under the shoulder $t^2$.

A plurality of chambers, as $s' s^2 s$, are shown to receive, as explained below, the strong, weak, and water-wash or the like solutions, respectively, and enable these to be kept distinct for subsequent treatment. The path, represented by any suitable rail or rails $r$, has a plurality, as three (not necessarily equidistant) points at which the trays are charged. At the first point is slime vessel 1, at the next point is a charging vessel, (which may be similar to vessel 1,) as 20, to automatically deliver weak solution to each upper tray passing it, and, again, farther on is a charging vessel or means (not shown) supplying, say, wash-water. Suitable intervals between charging devices are left to avoid letting the cakes travel needlessly far when dry or to avoid failure to extract from or dry them enough. By increasing or decreasing the speed of the trucks the process can be timed to suit the conditions. If at a slow speed the vacuum or suction produces too dry a cake before the next charging-point is reached, increased speed is adopted. It is desirable to supply the charge of weak solution or of water, or both in some cases, continuously along portion of the circuit or path of the mineral-containing tray and to do so in the form of spray. Part of spray-piping, which so extends for any distance, is marked $z$. It may be of any arrangement and be controlled by any suitable cocks.

$y$ shows part of a water-diffusing screen, which I locate ordinarily under the spouts or discharge ends of the vessels which supply the trays with liquid, as weak solution and water wash. This screen serves to drip the liquid all over the cake and keep it in good condition for the vacuum action. On the last wash being filtered, leaving a mineral cake, the truck reaches a tray-reversing device, which turns over the truck. As the turnover occurs the vacuum action is cut off, because shaft $m$ does not turn, so that passage $k'$ ceases to connect with the filter which carries the cake. Then the cake drops out with the aid of ordinary air-pressure, which enters at passage $l'$, or with the aid of compressed air applied to pipe or other agency. A fixed pulley 9 on truck $f$ contacts with an inverting-bar 10, so located that as the truck advances the friction of the bar causes the pulley (and thus the truck) to turn over.

11 shows an arm (extending from any suitable post or the like) by which to support bar 10, which is shown long in Fig. 1 to contact with the pulley throughout the turning movement. Any other suitable means for inverting are provided, if preferred.

Means to lock the truck to prevent turning when not required are indicated by recesses 12, (in pulley 9,) adapted in turn to receive a pin or stop-plate 13, Figs. 1, 2, 6, and 7. The pin 13 is normally in a recess 12, but at a suitable point in the circuit is withdrawn, and after the withdrawal the inversion aforesaid takes place, after which the pin is reinserted automatically. The pin is shown in Fig. 6 on an arm 14, attached to part $m'$ and having an arm or striker having a friction-roller or suitable outward end 15. There is an inclined plate 16 located in the path of end 15. This plate is shown in Figs. 1 and 2 supported from a side post with arm 17. When end 15 strikes inclined plate 16, it is forced to slide outward, thus freeing stop 13 from pulley 9, and when it passes the said stop-opening plate it moves inward and in due course locks the pulley, which meanwhile has turned over with its truck. The spring of arm 14 closes pin 13 in Fig. 6, but in Fig. 7 a separate spring 18 is shown, pin 13 working in suitable bearings, as in a frame or bracket 19, fixed to part $m'$. The plate 16 inclines at an angle to the horizontal in Figs. 1, 2, and 6, but at an angle to the vertical in Fig. 7.

21 shows a plate or roof, which slopes down, (usually on each side from a ridge 22.) Only one such roof is shown for convenience in Fig. 1; but one such is in some cases located over the gap between each two trucks, the roof edges overhanging the trays. These roofs are not required where it is decided not to adopt devices which overhang, (in order to save liquid as next mentioned;) but where there is means of delivery of liquid to the trays some liquid is (owing to the truck motion) apt to fall into the gaps between the said trucks. By using these roofs (which are supported on standards on and move with carriage $o$) the liquid will fall on the roofs and pass to the trays or be saved, as may be predetermined. Instead of the roofs having two water-sheds this may be varied by adopting only one slope in any predetermined direction.

What I claim as my invention, and desire to secure by Letters Patent of the United States, is—

1. The combination of a frame having thereon an upper filter-tray and a lower filter-tray, and means for transposing the trays at intervals to drop material from the first-named tray, substantially as described.

2. The combination of a frame having thereon an upper filter-tray and a lower filter-tray, means for transposing said trays at intervals to drop material from the first-named tray, and means for moving said frame along a track, substantially as described.

3. The combination of a track, a number of frames movable along said track, each frame being provided with a structure having thereon an upper filter-tray and a lower filter-tray, a shaft in said frame supporting said trays, said shaft being provided with a solution-passage and an air-passage, and means for transposing said trays at intervals, substantially as described.

4. The combination of a track, a plurality of frames movable along said track, a central column and connections between said frames and said columns, and an upper and lower filter-tray mounted in each of said frames, a shaft provided with a solution-passage and an air-passage on which said trays are mounted, and means for transposing said trays at intervals, substantially as described.

5. The combination of a track, a plurality of frames movable along said track, each frame being provided with an upper and lower tray and with a chamber under each tray, a shaft in said frame supporting said trays, the said shaft being provided with an air-passage and a solution-passage communicating with said trays respectively, means for causing said trays to travel along said track, and means for inverting said frames during the travel thereof, substantially as described.

6. In combination with a plurality of filters or trays, the upper connected with means for conveying solution therefrom, the lower connected with air-admission means, a tray-frame having means for preventing transposition during, and for allowing transposition after, the filtering.

7. The combination of a truck having thereon a transposable frame, a shaft provided with a solution-passage and an air-passage mounted in said frame, and a pair of filter-trays mounted on said shaft, each tray being provided with filtering material, means for making a tight joint to prevent the entrance of air around the edges of said filtering material, a vacuum-chamber, and a connection from said vacuum-chamber to the solution-passage in the shaft, substantially as described.

8. A filter-truck comprising upper and lower filters in a transposable frame, supports for the frame, means for moving the truck along a predetermined course and means for upper-filter charging, and for filtering therefrom during the truck motion.

9. A filter-frame movable along a path, a stop which normally holds the filter in filtering position and a projection from the stop, in combination with a stop-opening plate, and a spring or other means for reapplying the stop.

10. The combination of a reversible filter-frame, having thereon upper and lower filter-trays, a shaft provided with passages and having thereon an apertured pulley, and means for reversing said filter-frame, consisting of a stationary portion provided with an arm having a pin, said pin being adapted to engage in the apertures of said pulley, substantially as described.

11. The combination with frame $f$ having apertures 12, and a suitably-supported shaft $m$, of pin 13, end 15, plate 16 and spring 18 as described.

12. The combination of a series of filter-trucks arranged in a circle, each provided with a frame having thereon an upper and a lower filter-tray, means for moving said trucks in a circular path, and a tubular connection from said upper tray to a stationary vacuum-chamber, substantially as described.

13. The combination of a movable filter-tray, provided with a deflector, and means for charging the same, consisting of a lever adapted to be struck by said deflector, a slime-receptacle located in a higher plane than the filter-tray, valves in said slime-receptacle, and connections between said lever and said valves for operating them at the proper time, substantially as described.

14. A circular rotatable carriage, having filters in frames mounted on it, and from each frame projections by which to engage devices to turn over each truck at a predetermined point, and then charge each upper filter with slime at another predetermined point a short distance onward.

15. A continuous path for the conveyance of filters in frames, and, at suitable distances apart along the said path, a series of filter-charging devices, and means on the frames or the like for actuating the charging devices.

16. A series of filters in frames, a continuous path for the same to move along, charging devices along the path, actuating means on the frames to deliver the contents of the charging devices to the filters, and filter-transposing means also actuated by the frames.

17. The combination of a circular track, a series of filter-trucks mounted on said track, each track being provided with a reversible filter-frame, carrying upper and lower filter-trays, a central stationary structure forming a vacuum-chamber, and a pipe leading from each filter-frame into said structure, substantially as described.

18. A truck having thereon a reversible filter-frame, said frame having a pipe to a vacuum-chamber or the like, means to charge a filter of said truck with slime, and means to close and to open a valve on the said pipe before and after the said charging respectively.

19. A pipe $r$ having a valve $r'$, spindle $w^2$ and friction-wheel $w'$ to each truck of a revoluble series thereof containing filters, and means to turn the valves off and on in turn substantially as described as the trucks move past the blocks.

20. The combination of a track, a series of filter-trucks movable along said track, each truck being provided with a frame carrying an upper and a lower filter-tray, charging devices located above the level of said trucks, means partly located on said charging devices and partly on said filter-trucks for operating said charging devices at intervals, and means to prevent the material from the charging devices from being dropped between two successive filter-trucks, substantially as described.

21. A series of fixed chambers $s$, $s'$, $s^2$, a revoluble casing $t$, $t'$ inclosing them, an upper space $n$, a series of pipes $r$ extending from filters into space $n$, means to create a vacuum or the like in the said chambers, pipes and upper space, and means to cause the pipes to move round so as to feed each chamber $s$, $s'$ and $s^2$ in turn.

In witness whereof I have hereunto set my hand in the presence of two witnesses.

WILLIAM THOMAS WEEKLEY.

Witnesses:
G. G. TURRI,
B. M. LOWE.